US008839963B2

(12) United States Patent
Torres-Collazo

(10) Patent No.: US 8,839,963 B2
(45) Date of Patent: Sep. 23, 2014

(54) BAFFLE CHAMBER DRAINING VALVE

(76) Inventor: Angel Torres-Collazo, Caguas, PR (US)

( * ) Notice: Subject to any disclaimer, the term of this patent is extended or adjusted under 35 U.S.C. 154(b) by 83 days.

(21) Appl. No.: 13/548,962

(22) Filed: Jul. 13, 2012

(65) Prior Publication Data
US 2013/0015123 A1 Jan. 17, 2013

Related U.S. Application Data

(60) Provisional application No. 61/507,629, filed on Jul. 14, 2011.

(51) Int. Cl.
B01D 21/24 (2006.01)
B01D 21/00 (2006.01)
F16K 3/02 (2006.01)

(52) U.S. Cl.
CPC ........ B01D 21/0024 (2013.01); B01D 21/2483 (2013.01); F16K 3/0218 (2013.01); B01D 21/0069 (2013.01); B01D 21/0003 (2013.01); B01D 21/0006 (2013.01); B01D 21/003 (2013.01); B01D 21/0042 (2013.01)
USPC ......... 210/521; 210/532.1; 210/541; 137/574

(58) Field of Classification Search
CPC ........... B01D 21/0003; B01D 21/0006; B01D 21/0024; B01D 21/003; B01D 21/0042; B01D 21/0069; B01D 21/02; B01D 21/24; B01D 21/245; B01D 21/2483; E02B 7/26; E02B 7/28; E02B 7/34; E02B 7/36; F16K 3/0218

USPC .............. 210/521, 522, 532.1, 538, 540, 541, 210/801, 803; 137/574; 405/103, 104, 106; 251/326
See application file for complete search history.

(56) References Cited

U.S. PATENT DOCUMENTS

| 2,058,044 | A | * | 10/1936 | Spencer | 210/538 |
| 2,799,645 | A | * | 7/1957 | Musgrove | 210/521 |
| 3,330,530 | A | * | 7/1967 | Andrae | 251/326 |
| 3,401,527 | A | * | 9/1968 | Palmer et al. | 405/106 |
| 4,133,771 | A | | 1/1979 | Pielkenrood | |
| 4,436,622 | A | * | 3/1984 | Petretti | 210/241 |
| 4,472,277 | A | * | 9/1984 | Bailey et al. | 137/574 |
| 5,503,747 | A | * | 4/1996 | Vion et al. | 210/521 |
| 5,503,753 | A | * | 4/1996 | Woodall et al. | 210/521 |
| 6,321,916 | B1 | * | 11/2001 | Rickelm et al. | 210/532.1 |
| 6,899,808 | B1 | * | 5/2005 | Ott | 210/532.1 |

FOREIGN PATENT DOCUMENTS

SU 1039900 9/1983

* cited by examiner

Primary Examiner — Christopher Upton
(74) Attorney, Agent, or Firm — Luis Figarella

(57) ABSTRACT

A water purifying apparatus and system capable of sedimenting particulates in the fluid over time, and allowing for the quick flushing of sedimented particulates. Top and bottom baffles act as barriers for the sediments, with the bottom barriers having a removable barrier.

1 Claim, 9 Drawing Sheets

500

600

BAFFLE CHAMBER DRAINING VALVE

CROSS-REFERENCE TO RELATED APPLICATIONS

This application claims priority to U.S. provisional patent application Ser. No. 61/507,629 titled "Baffle Chamber Draining Valve" filed on Jul. 14, 2011, the disclosure of which is herein incorporated by reference in its entirety.

PATENTS CITED

The following documents and references are incorporated by reference in their entirety, Use et al (U.S. Pat. No. 7,011,743).

FIELD OF THE INVENTION

The present invention relates generally to water pollution traps and, more particularly, to separators for separating and collecting various pollutants from the intake into water treatment plants.

DESCRIPTION OF THE RELATED ART

Water treatment involves removal of undesirable constituents from water and then disposal of them in easiest and safest manner. To achieve these goals, a variety of treatment operation and processes are utilized, which exploit various physical and chemical phenomena to remove or reduce the undesirable constituents from the water.

Baffle boxes are concrete or fiberglass structures containing a series of sediment settling chambers separated by baffles. The primary function of baffle boxes is to remove sediment, suspended particles, and associated pollutants from water. Baffle boxes may also contain trash screens or skimmers to capture larger materials, trash, and floatables. Those operations used in the treatment of water in which change is brought about by means of or through application of physical forces are known as unit operations (UO). Those processes used for the treatment of water in which change is brought about by means of chemical reaction are known as unit processes (UP).

One of the critical steps in the separation of solids is the use of chamber in combination with Chemical precipitation through various combinations of the coagulation, flocculation, ion exchange, aeration, gas transfer, and other processes.

The above work great at separating the solids from the clean water. Unfortunately, the solids being separated tend to clog the operation of the mixing chambers and baffled chambers used to allow for the separation. There is the need in the art for enhancements that would allow for the cleaning of the sediment from said baffle chambers.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

In one aspect the invention comprises a baffle for use in a water treatment baffle chamber, said baffle comprising, an elongated body spanning the width of baffle chamber and extending from the bottom of said baffle chamber to a predetermined height within said baffle chamber, said baffle having one or more openings along its bottom, with each opening having one or more valves capable of sealing them and each said valve having open or close means that are actuatable remotely. In another aspect, said valves are each comprised of a door that covers the opening on said baffle and slides up or down in response to the valve open or close means. In yet another aspect, said valve open or close means are comprised of a handle secured to the side of said baffle that travels along said top baffle's length.

In another aspect, the invention is a baffle chamber system comprising a sealed water enclosure having one or more input pipes and one or more output pipes, one or more top baffles, each said top baffle installed along the length of said baffle chamber so that there is a gap between the bottom of said chamber and the bottom of said top baffle, allowing water to flow under said top baffle along said baffle chamber, one or more bottom baffles installed along the length of said baffle chamber in order to form sub-chambers, each said bottom baffle comprised of an elongated body spanning the width of said baffle chamber and extending from the bottom of said baffle chamber to a predetermined height so that water may spill sequentially from one sub-chamber to the next, said bottom baffle having one or more openings along its bottom, with each opening having one or more valves capable of sealing them and each said valve having open or close means that are actuatable remotely. In another aspect, said valves are each comprised of a door that covers the opening on said top baffle and slides up or down in response to the valve open or close means. In yet another aspect, said valve open or close means are comprised of a handle secured to the side of said top baffle that travels along said top baffle's length.

Other features and advantages of the present invention will become apparent upon examining the following detailed description of an embodiment thereof, taken in conjunction with the attached drawings.

The above-described and other features will be appreciated and understood by those skilled in the art from the following detailed description, drawings, and appended claims.

DETAILED DESCRIPTION OF THE PREFERRED EMBODIMENT

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Figure 1:
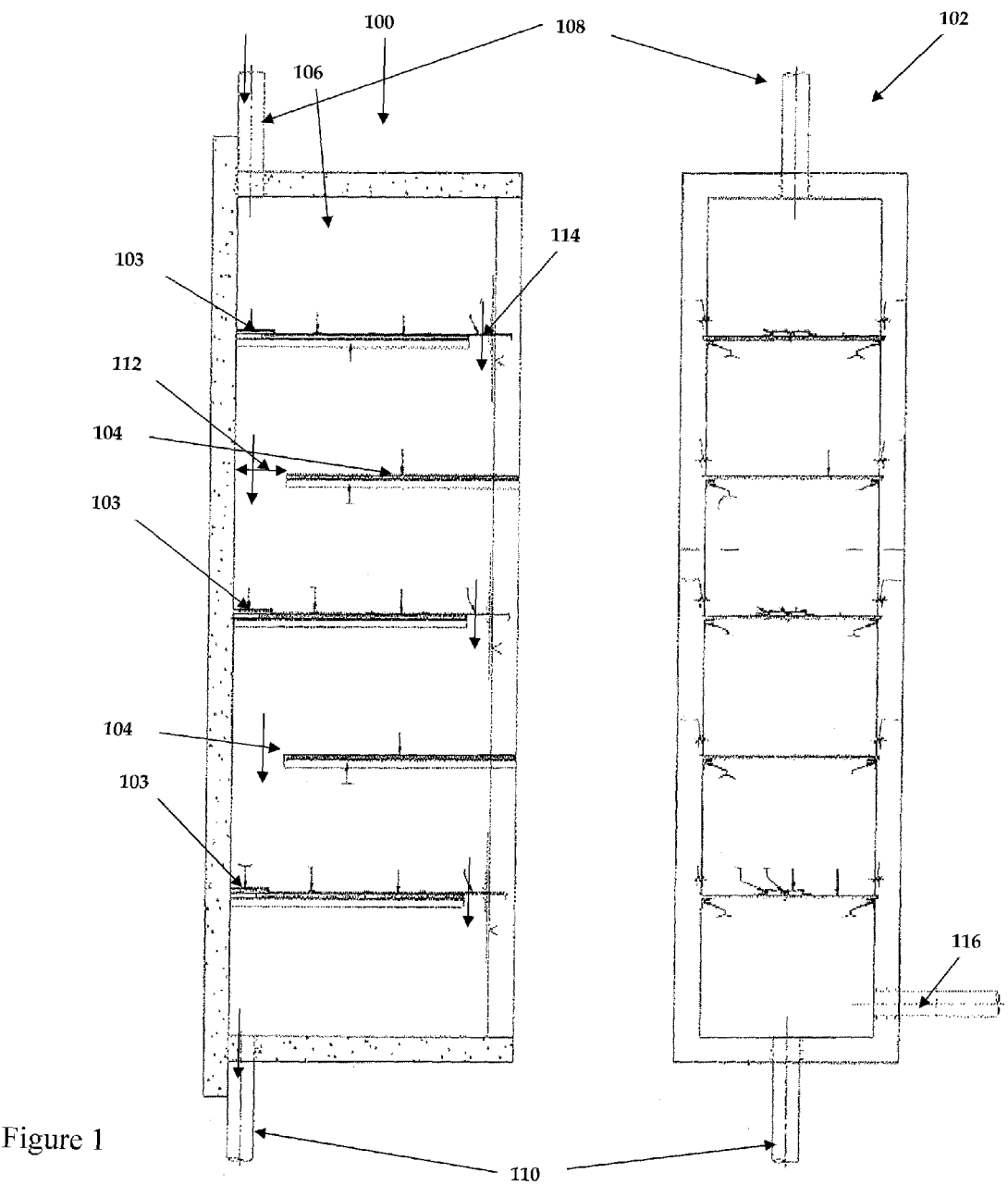
FIG. 1 illustrates an improved baffle chamber, according to an illustrative embodiment of the invention.

FIG. 1 illustrates a side 100 and top 102 view of the system. A baffled chamber 106 has an input pipe 108 and an output pipe 110. Water or other fluids, but usually water with solids floating within it, is allowed to enter the chamber 106, and flows above and below a set of bottom baffles 103 and top baffles 104, these top/bottom baffles form one or more sub-chambers. As the fluids flow through the system, gravity and eddy currents facilitate their deposition at the bottom. In many cases, the defecation of solids within the fluid is accelerated through the addition of polymers and other coagulation or flocculation materials.

Coagulation and flocculation are the unit processes to convert the stable colloidal particles into settle-able flocs by destabilizing the charge on the colloids so as to remove turbidity from the water. Water with little or no turbidity will be clear. In addition to removing turbidity from the fluid, sedimentation within the unit helps to settle out the suspended particles in water by gravitational force, said particles resting within the sub-chambers formed between bottom baffles 103. This is achieved by lowering the flow velocity of the water below the suspension velocity in a basin to settle out suspended particles by gravity. The process is also known as settling or clarification.

The fluid continues to travel through the various chambers, and comes out of the output pipe 110 with a significant reduction of solids, those that have been trapped within the sub-chambers. Since these solids remain within the volume of the chamber 106, over time, they will proceed to plug the gap 112 formed between the bottom of the chamber and the lower portion of the top baffle 104. This clogging will either reduce the overall throughput of the unit, or through hydraulic force, allow for the solids to move from one sub-chamber to another, resulting in their coming out through the output pipe 110. To avoid this, baffle chambers 106 are regularly opened, the top/bottom baffles (103/104) removed and the complete insides flushed.

Figure 2:
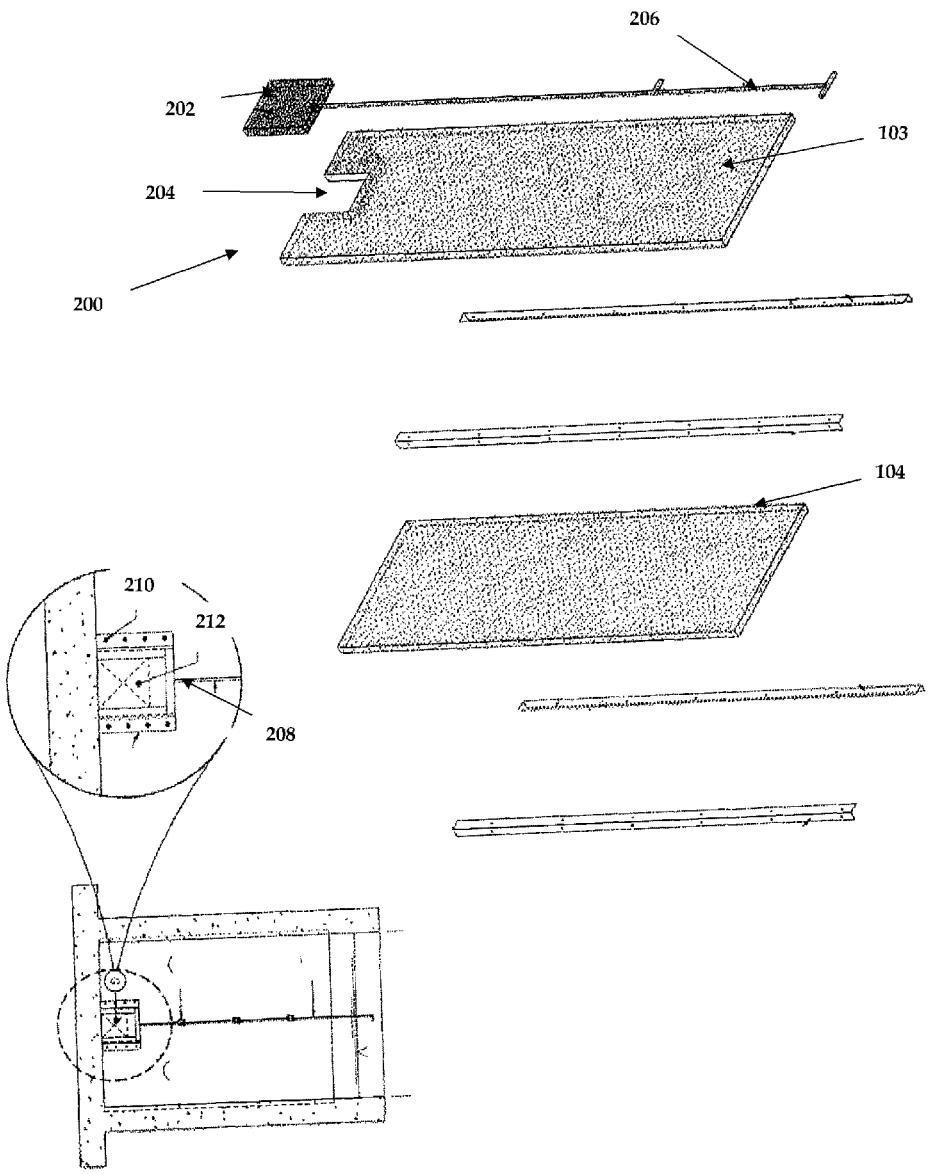
FIG. 2 illustrates a selective flow baffle, according to an illustrative embodiment of the invention.
Figure 3:
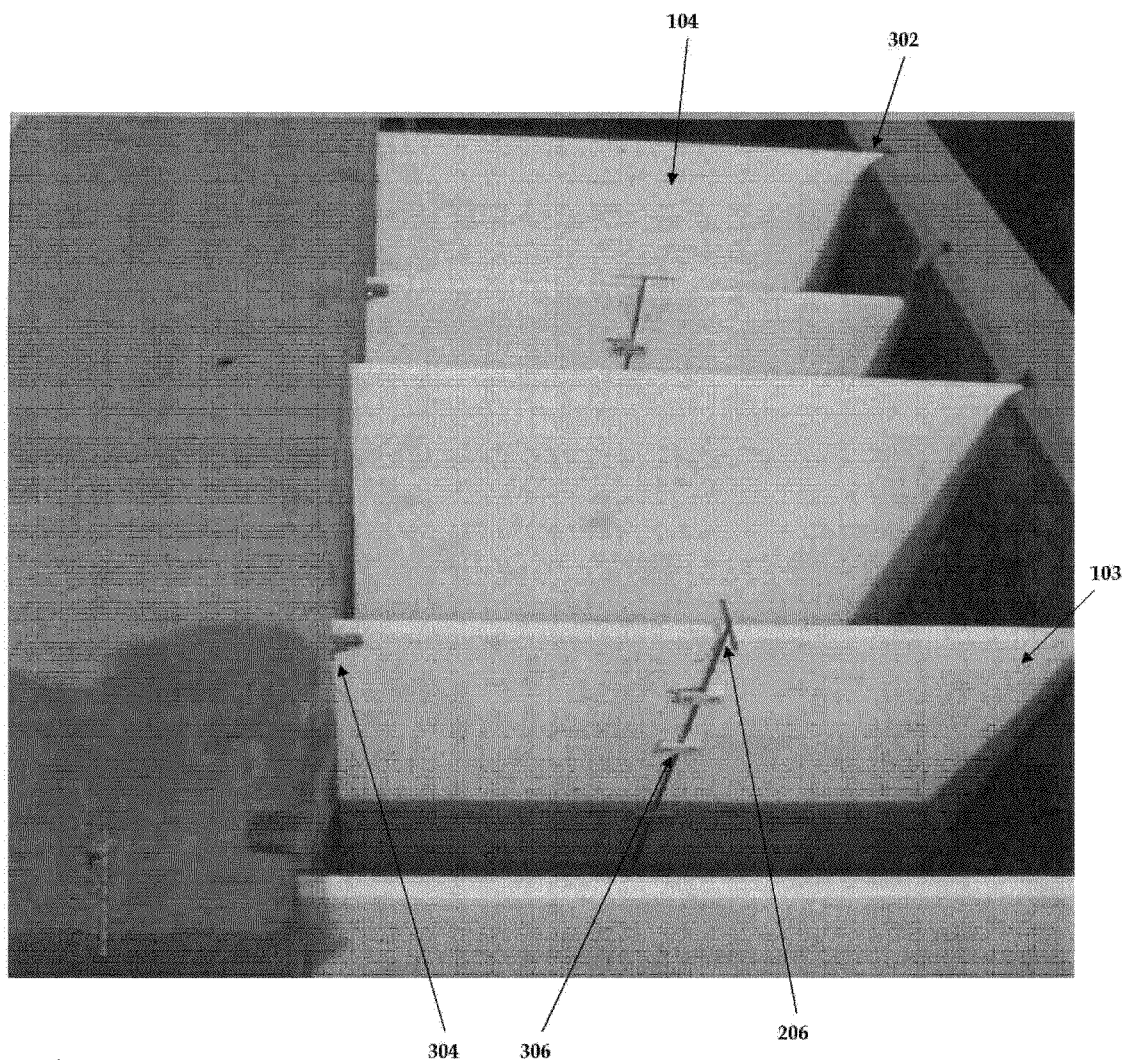
FIGS. 3-9 illustrate portions of an improved baffle chamber, according to various exemplary and illustrative embodiment of the invention.

Referring to FIG. 2, we see how the invention 200 allows for this flushing to occur without removal of the baffles (103, 104). This is accomplished through the addition of one or more valves 202 placed over openings 204 that are located at or significantly near the bottom of the bottom baffle 103. In one embodiment, the valve 202 is a door that covers the opening 204 and remains closed during normal operation of the system. In this fashion, hydraulic force will cause the fluid to flow over the top 114 of the bottom baffle 103, causing the sediment to settle in front of said bottom baffle's 103.

In one embodiment, the valve 202 is a trapdoor 212 secured in place by two side channels (208, 210) and having a handle or slider 206 that extends from the trapdoor body to a point reachable by the operator (at or significantly near the top of the bottom baffle 103). Acting on said slider 206 slides the trapdoors 212 up/down, resulting in the opening of the sub-chamber's bottom.

To clean the chamber 106, operators open one or more of the bottom baffle's valves 202 by activating the valve's opening means 206. In many units, there is either a bypass channel 116 located within the chamber 106, or one outside connected to the output pipe 110 (in order to prevent the sediment from coming in contact with the clean water in the rest of the system).

Pressured water (usually from a high pressure hose) is then used to "flush" the system, allowing the collected detritus to flow sequentially through the openings 204 from one sub-chamber to the next, resulting in a baffle chamber that can be cleaned without removal of the individual baffles. The top baffles 104 may remain in place throughout the previous cleaning.

In one embodiment, the baffles and other assembly components are made of a combination of materials, including formable corrosion-resistant material selected or combined from the group comprising concrete, high molecular weight polyethylene, thermoplastic, fiberglass-reinforced polymer, carbon fiber, and/or both ferrous and non-ferrous metals. The above may specifically include stainless steel, aluminum, brass, wood, concrete, as well as polymers, plastic or thermoplastic, including such well known materials as nylon, ABS ("acrylonitrile butadiene styrene") or other such moldable plastics, in addition to composites (both carbon, fiberglass and others.

Figure 4:
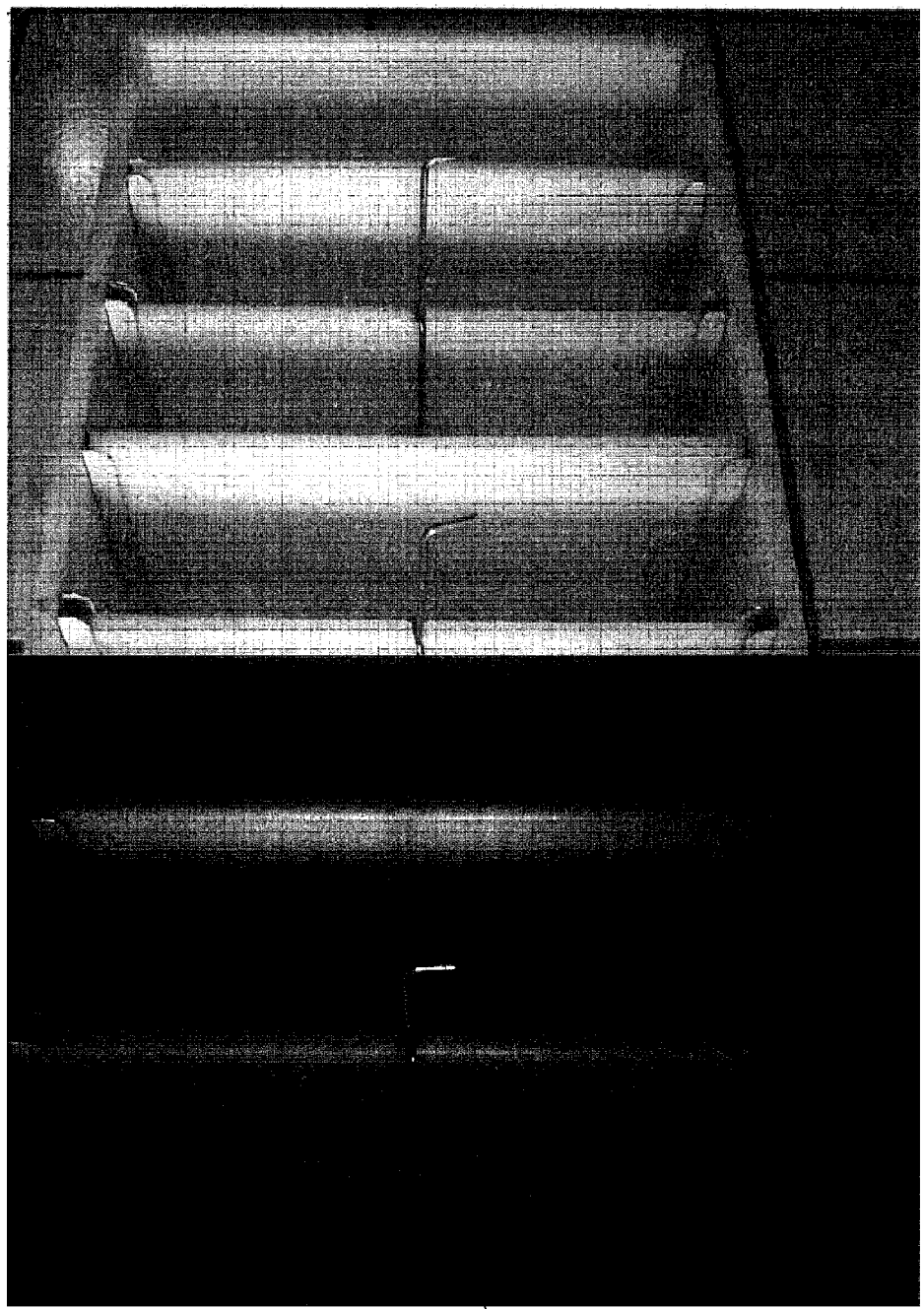

Referring to FIGS. 3-9, a number of features in various embodiments may be noted. The slider 206 may be held in place by one or more sleeves 306. The top/bottom baffles (103/104) may be secured to the baffle chamber sides via a combination of slots 302 or brackets 304. Sais brackets may be secured to the side of the chamber 304, or slides may be secured to both sides 400 of the baffle chamber (FIG. 4).

Figure 5:
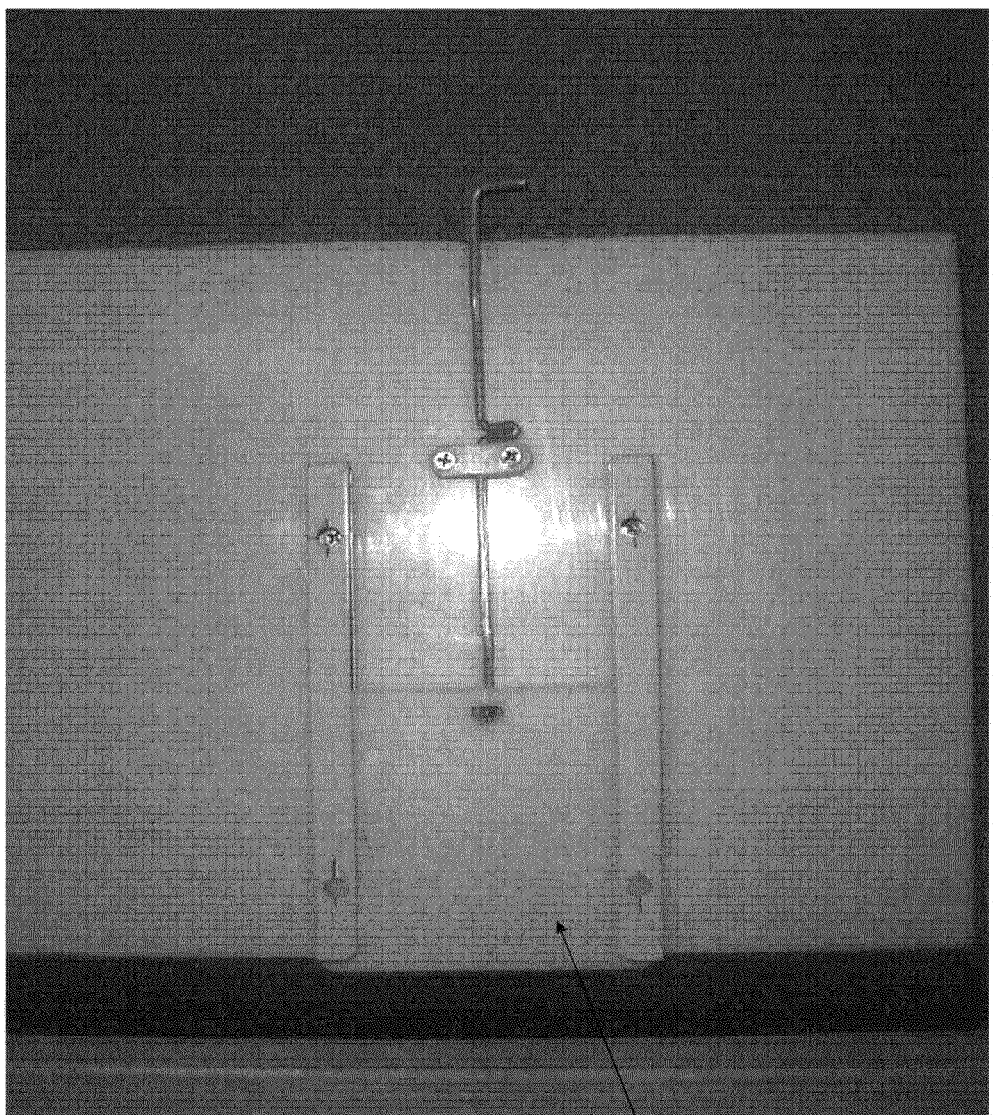
Figure 6:
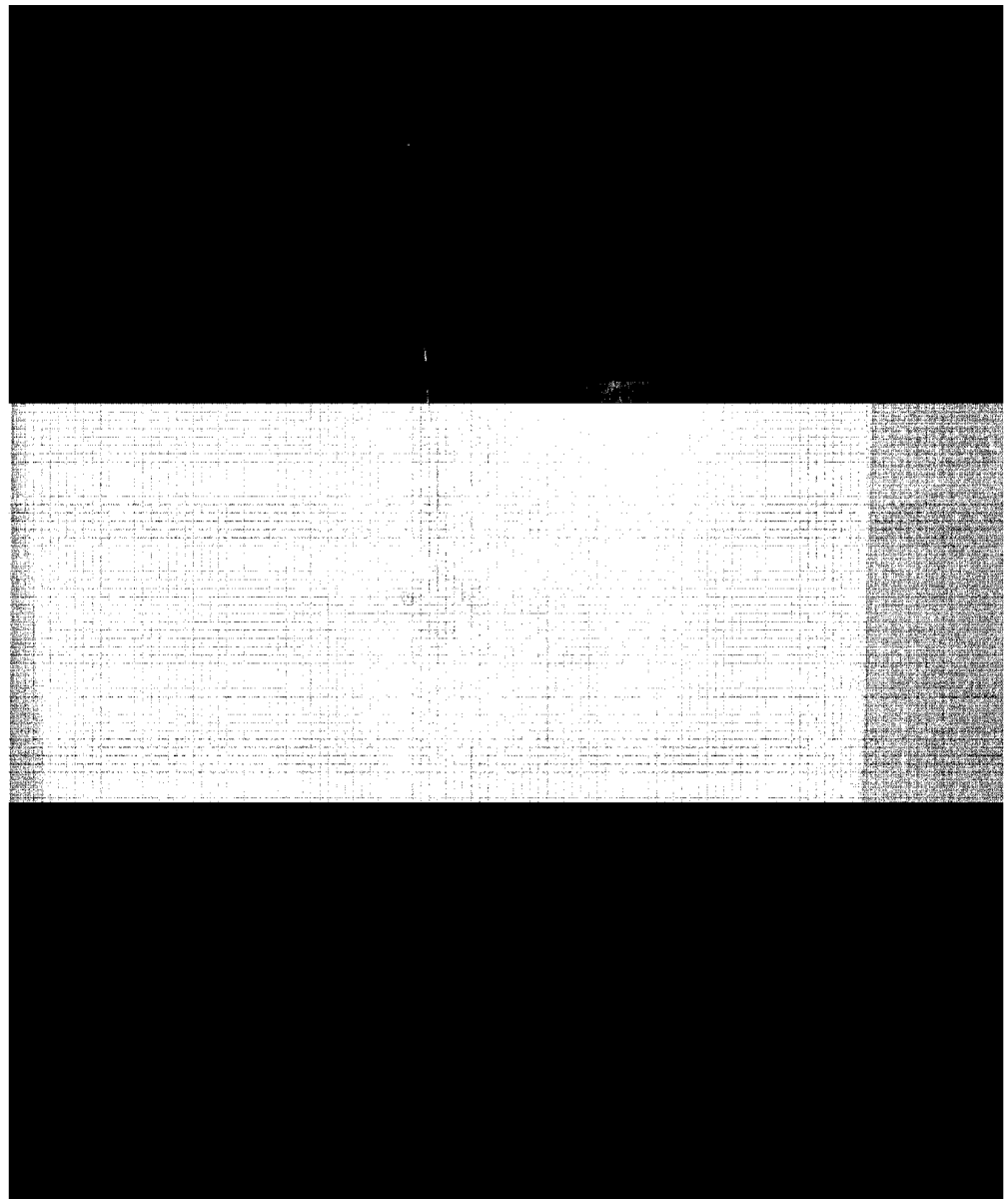
Figure 7:
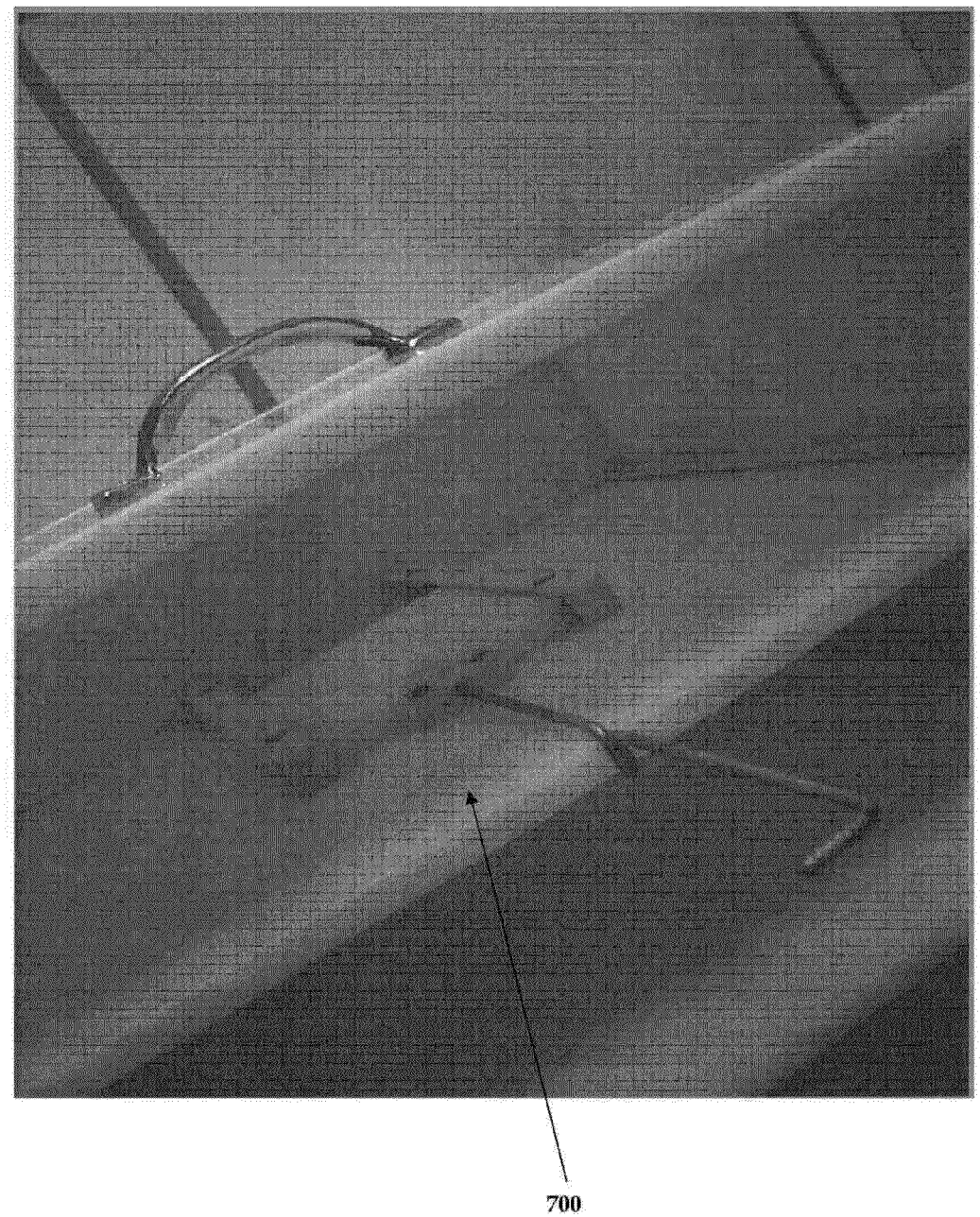
Figure 8:
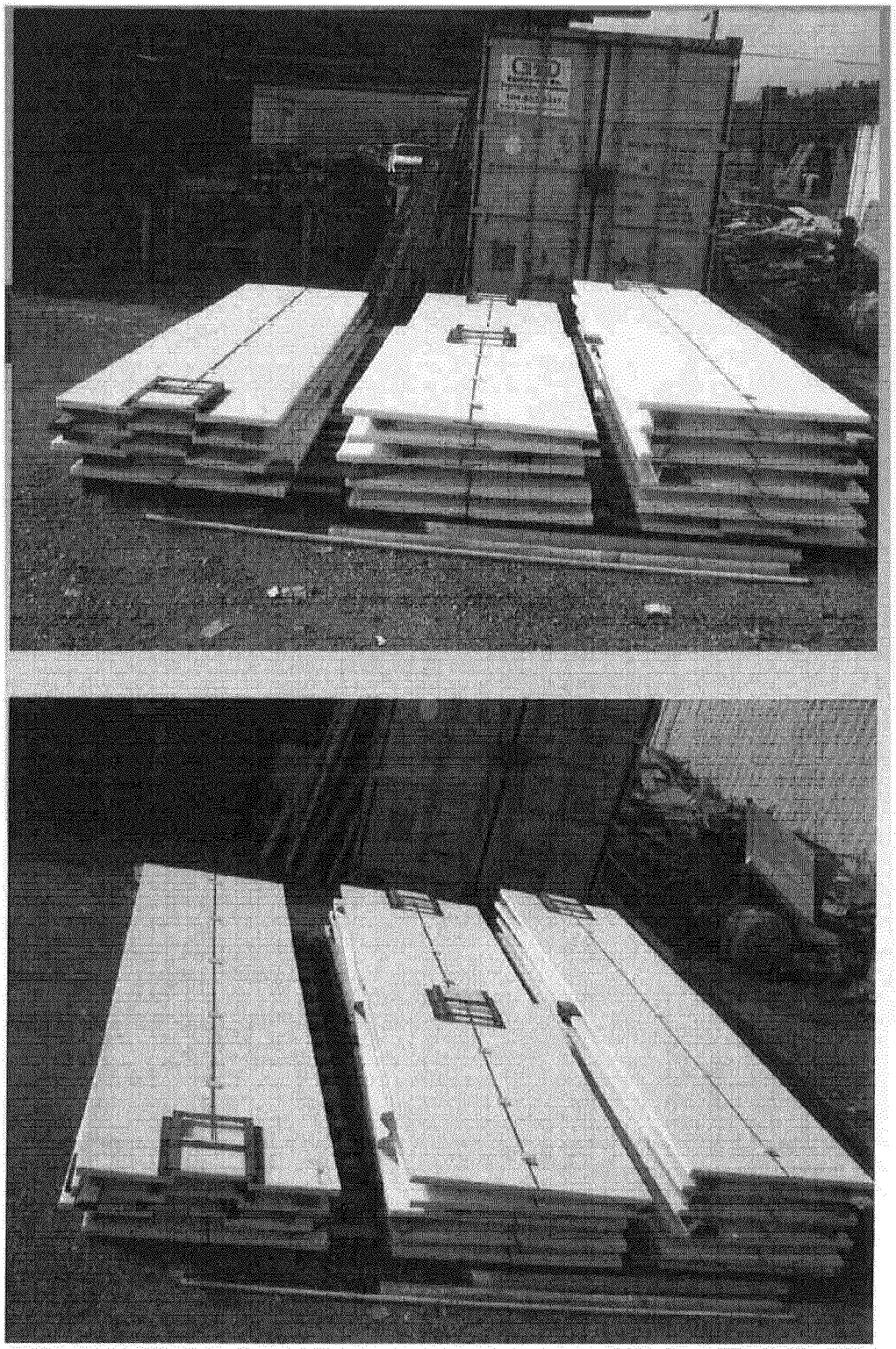
Figure 9:
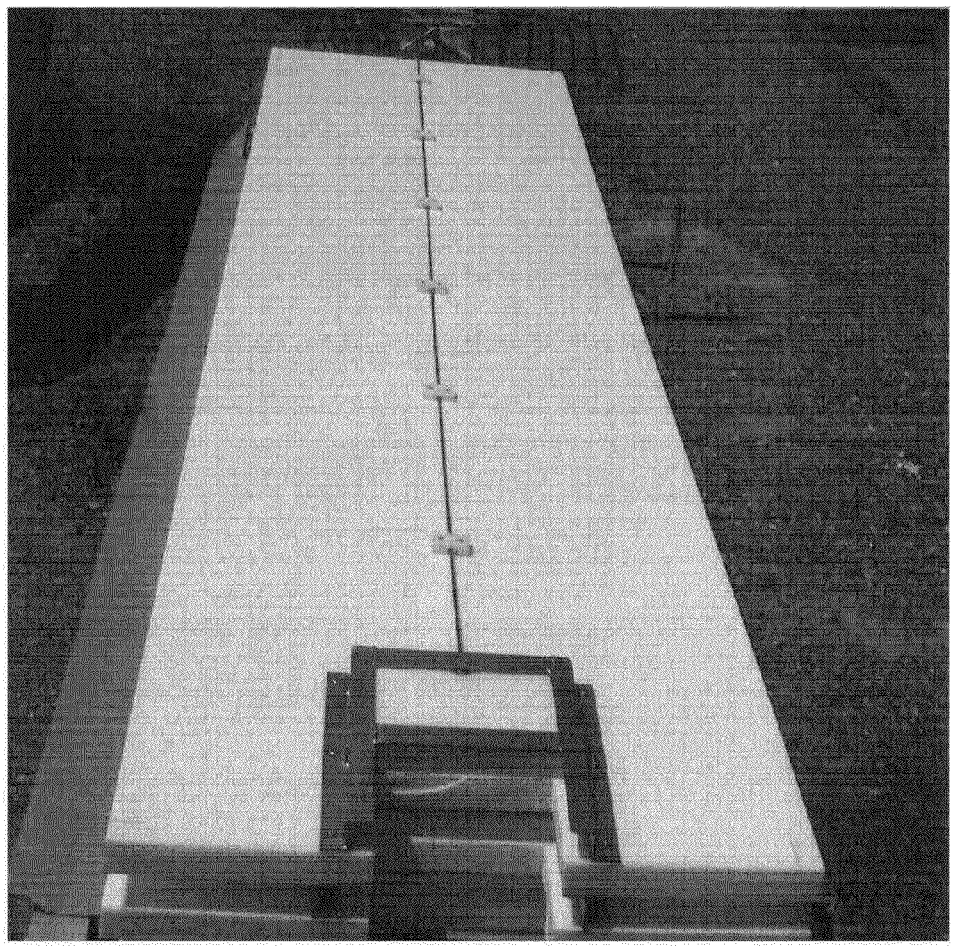

Referring to FIGS. 5-7, we see a valve in the closed 500 and open 600 positions, as well from the top view while open 700. A critical advantage of the invention is the ability to retrofit any sized baffle chamber, as seen in FIGS. 8-9. In one embodiment the advantage of the baffles as embodied, is that they may be easily built of any lengths, and retrofitted into already built chambers.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

The invention claimed is:

1. A baffle chamber water treatment system comprising;
  a flat bottomed and sealed water enclosure having one or more input pipes and one or more output pipes, said pipes located at or above said enclosure's bottom;
  one or more top baffles having an elongated body spanning the width of said baffle chamber, each said top baffle installed along the length of said baffle chamber so that there is a gap between the bottom of said chamber and the bottom of said top baffle, allowing water to flow under said top baffle along said baffle chamber;
  one or more bottom baffles installed along the length of said baffle chamber in order to form sub-chambers, each said bottom baffle comprised of an elongated body spanning the width of said baffle chamber and extending from the bottom of said baffle chamber to a predetermined height so that water may spill sequentially from one sub-chamber to the next, said bottom baffle having one or more openings along its bottom, with each said opening reaching the bottom edge of said baffle and having one or more valves capable of sealing them wherein each said valve is comprised of a door that covers the opening on said baffle and slides up or down in response to the valve open or close means; and
  each said valve open or close means are comprised of a handle secured to the side of said baffle that travels along said baffle's height to the top.

* * * * *